United States Patent
Sharon et al.

(10) Patent No.: US 11,602,791 B2
(45) Date of Patent: Mar. 14, 2023

(54) METHOD FOR ADDITIVE MANUFACTURING WITH MODIFIED POWDER

(71) Applicant: United Technologies Corporation, Farmington, CT (US)

(72) Inventors: John A. Sharon, West Hartford, CT (US); Paul Sheedy, Bolton, CT (US); Ranadip Acharya, Rocky Hill, CT (US); Vijay Narayan Jagdale, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 444 days.

(21) Appl. No.: 16/131,700

(22) Filed: Sep. 14, 2018

(65) Prior Publication Data
US 2020/0086387 A1  Mar. 19, 2020

(51) Int. Cl.
*B22F 10/20* (2021.01)
*B22F 10/28* (2021.01)
(Continued)

(52) U.S. Cl.
CPC .............. *B22F 10/20* (2021.01); *B22F 1/054* (2022.01); *B22F 1/16* (2022.01); *B22F 10/28* (2021.01);
(Continued)

(58) Field of Classification Search
CPC ................. B23K 26/0006; B23K 26/0626
See application file for complete search history.

(56) References Cited

U.S. PATENT DOCUMENTS 7,611,756 B2  11/2009 Pfeifer et al.
9,796,019 B2  10/2017 She
(Continued)

FOREIGN PATENT DOCUMENTS

GB   2559950 A       2/2017
GB   2559950 A  *    8/2018  ......... C22C 32/0026

OTHER PUBLICATIONS

Luo, et al. "Al2O3 nanoparticles reinforced Fe—Al laser cladding coatings with enhanced mechanical properties," Apr. 2018, Journal of Alloys and Compounds, vol. 755, pp. 41-54 (Year: 2018).*
Wu et al. "Microstructures of laser-deposited Ti—6Al—4V," Materials and Design, vol. 25, pp. 137-144 (Year: 2004).*
(Continued)

*Primary Examiner* — Anthony J Zimmer
*Assistant Examiner* — Dean Mazzola
(74) *Attorney, Agent, or Firm* — Getz Balich LLC (57) ABSTRACT

A process for additive manufacturing of a metal alloy material is provided that includes: a) providing a feedstock powder comprising base powder particles with nanoparticles attached to surfaces of the base powder particles; b) providing an additive manufacturing system with a laser power source relatively movable at a scan speed; c) wherein the additive manufacturing system has a process window for the feedstock powder; and d) exposing the feedstock powder to a predetermined power input from the laser power source at a predetermined scan speed to produce the metal alloy material. The concentration by volume of nanoparticles within the feedstock powder is such that independent first and second microstructures may be produced within the metal alloy material.

17 Claims, 6 Drawing Sheets

(51) Int. Cl.
*B33Y 70/10* (2020.01)
*B23K 26/00* (2014.01)
*B23K 26/06* (2014.01)
*B22F 1/16* (2022.01)
*B22F 1/054* (2022.01)
*B22F 10/30* (2021.01)

(52) U.S. Cl.
CPC ...... *B23K 26/0006* (2013.01); *B23K 26/0626* (2013.01); *B33Y 70/10* (2020.01); *B22F 10/30* (2021.01)

(56) References Cited

U.S. PATENT DOCUMENTS

| | | |
|---|---|---|
| 2016/0279703 A1 | 9/2016 | Clare |
| 2017/0021417 A1 | 1/2017 | Martin et al. |
| 2017/0368602 A1 | 12/2017 | She |
| 2017/0368603 A1 | 12/2017 | Beals |
| 2018/0051376 A1 | 2/2018 | Sharon |
| 2019/0032175 A1* | 1/2019 | Martin ................ B23K 26/342 |
| 2019/0247919 A1* | 8/2019 | Kim ..................... C10L 1/12 |

OTHER PUBLICATIONS

Zhang et al. "Laser clad Ni-base alloy added nano- and micron-size CeO2 composites", Optics & Laser Technology 40 (2008) 716-722.
Resodyn, "Resonant Acoustic Mixing", 2009 http://resodynmixers.com/applications/coating.
Bergstrom, "The Absorption of Laser Light by Rough Metal Surfaces", Lulea University of Technology, Feb. 2008.
Lee et al. "Influence of Fluid Convection on Weld Pool Formation in Laser Cladding", Welding Journal, Aug. 2014, vol. 93.
Gu et al. "Laser Additive Manufacturing of Metallic Components: Materials, Processes and Mechanisms", International Materials Reviews, vol. 57, No. 3, May 1, 2012, pp. 133-164.
Sames et al. "The Metallurgy and Processing Science of Metal Additive Manufacturing", International Materials Reviews, vol. 61, No. 5, Mar. 7, 2016, pp. 315-360.
EP search report for EP19197224.9 dated Dec. 18, 2019.
Dehoff et al. "Site Specific Control of Crystallographic Grain Orientation Through Electron Beam Additive Manufacturing", Materials Science and Technology, vol. 31, No. 8, pp. 931-938, Dec. 10, 2014.
Parimi et al. "Microstructural and Texture Development in Direct Laser Fabricated IN718", Materials Characterization, vol. 89, pp. 102-111, Dec. 12, 2013.
EP office action for EP19197224.9 dated Dec. 20, 2022.

* cited by examiner

METHOD FOR ADDITIVE MANUFACTURING WITH MODIFIED POWDER

BACKGROUND OF THE INVENTION

1. Technical Field

The present disclosure relates to additive manufacturing methods, apparatus, and powders, and more particularly to additive manufacturing methods, apparatus, and powders that utilize modified powders.

2. Background Information

Additive manufacturing ("AM") techniques are commonly used to fabricate structures by adding successive layers to a substrate. Some AM techniques form the layers by fusing particulate to the underlying layer as an integral layer, generally through application of a high energy input (e.g., a laser beam or electron beam. The particulate is subjected to the high energy input according to the geometry of a two dimensional slice of an article such that a layer of fused particulate forms overlaying the previously formed layer (or substrate). The throughput and efficiency of such AM systems can be influenced by the amount of energy necessary to fuse the particulate into a given layer. The composition of the particulate fused into the layers of the article can influence the mechanical, thermal, and/or electrical properties of the article produced with the additive manufacturing technique.

Many alloys are not amenable to additive manufacturing due to the adverse way in which they solidify from the molten state. Dendritic solidification that is typical for complex alloys can result in columnar grain morphology and consequently shows evidence of solidification cracking in the inter-dendritic space. Cracking is clearly undesirable and the columnar grains, while possibly beneficial for creep, can cause issues if anisotropic behavior (compared to a material with equiaxed grains for more isotropic properties) is not desired. This is a particular challenge for laser powder bed fusion as most additive systems limit the grain morphology to a columnar shape and if the alloy composition tends towards dendritic solidification then cracking becomes a prevalent risk.

AM systems typically have operational mechanical limitations including the maximum available energy input of the AM system and the "scan speed" of the system. The term "energy input" as used herein refers to the amount of energy that may be produced by the energy source of the AM system (e.g., the laser beam) during the AM process. In those instances where the AM system utilizes a laser as an energy input device, the amount of energy input available from the laser may vary depending upon, for example, the intensity of the laser, the wavelength of the light, the angle of incidence of the laser beam, and the polarization of the laser light. The term "scan speed" typically refers to the relative movement between the energy source (e.g., a laser beam) of the AM system and the substrate being produced. A given AM device may be described as having a "process window" for a given powder. In some instances, the process window is a function of the energy input from the AM system (e.g., the amount of energy produced by the laser) and the scan speed of the AM system. The process window may be expressed within a graph having energy input on one axis (e.g., the Y-axis) and the scan speed on the opposite axis (e.g., the X-axis). Typically, such a graph would also depict characteristics of the material produced by the AM process; e.g., different microstructure regions such as a columnar microstructure region, an equiaxed microstructure region, and a mixed columnar and equiaxed microstructure region.

A process window can therefore illustrate limitations in the type of microstructure that can be formed in a metal or metal alloy material using a given AM system and powder. A person of skill in the art will recognize that the microstructure of a material often affects the mechanical properties of the material, and that a component formed of a particular material will be acceptable when the material has a first microstructure, but will not be acceptable when the material has a different second microstructure. Hence, a process window can provide information regarding whether it is feasible to produce some components using an AM process.

What is needed is, therefore, is an AM process that overcomes the shortcomings of the prior art.

SUMMARY

According to an aspect of the present disclosure, a process for additive manufacturing of a metal alloy material is provided. The process includes: a) providing a feedstock powder comprising base powder particles with nanoparticles attached to surfaces of the base powder particles, the feedstock powder having a concentration by volume of nanoparticles; b) providing an additive manufacturing system with a laser power source relatively movable at a scan speed; c) wherein the additive manufacturing system has a process window for the feedstock powder, the process window defined by a maximum power input from a laser power source and a maximum scan speed; and d) exposing the feedstock powder to a predetermined power input from the laser power source at a predetermined scan speed to produce the metal alloy material; wherein the concentration by volume of nanoparticles within the feedstock powder is such that the exposing the feedstock powder to a first said predetermined power input from the laser power source at a first said predetermined scan speed gives the metal alloy material a first microstructure, and exposing the feedstock powder to a second said predetermined power input from the laser power source at a second said predetermined scan speed gives the metal alloy material a second microstructure, wherein the first microstructure is different from the second microstructure.

In any of the aspects or embodiments described above and herein, the first said predetermined power input from the laser power source and the first said predetermined scan speed are within the process window, and the second said predetermined power input from the laser power source and the second said predetermined scan speed are within the process window.

In any of the aspects or embodiments described above and herein, the first microstructure may be a columnar microstructure.

In any of the aspects or embodiments described above and herein, the second microstructure may be an equiaxed microstructure.

In any of the aspects or embodiments described above and herein, the second microstructure may be a mixed equiaxed and columnar microstructure.

In any of the aspects or embodiments described above and herein, the concentration by volume of nanoparticles within the feedstock powder may be such that the exposing the feedstock powder to a third said predetermined power input from the laser power source at a third said predetermined scan speed gives the metal alloy material a third microstructure.

In any of the aspects or embodiments described above and herein, the exposing the feedstock powder to said predetermined power input from the laser power source at said predetermined scan speed to produce the metal alloy material may be performed a plurality of times, each time collectively adding layers of the metal alloy material on top of one another.

In any of the aspects or embodiments described above and herein, at least one of the layers of the metal alloy material may possess the first microstructure, and at least one of the layers of the metal alloy material may possess the second microstructure.

In any of the aspects or embodiments described above and herein, the feedstock powder may have a first reflectivity value for a given wavelength of light produced by the laser power source, and the base powder may have a second reflectivity value for a given wavelength of light produced by the laser power source, and the first reflectivity value is less than the second reflectivity value.

In any of the aspects or embodiments described above and herein, the metal alloy material may be a nickel alloy material.

In any of the aspects or embodiments described above and herein, the metal alloy material may be an aluminum alloy material.

In any of the aspects or embodiments described above and herein, the base powder particles may comprise a first material type and the nanoparticles may comprise a second material type, and the first material type is different from the second material type.

In any of the aspects or embodiments described above and herein, the concentration by volume of nanoparticles within the feedstock powder is less than a concentration that has a deleterious effect on the metal alloy material.

According to another aspect of the present disclosure, a method of additively manufacturing a metal alloy material is provided. The method includes: a) providing a feedstock powder having a base powder with a plurality of surface attached nanoparticles, wherein the base powder has a first reflectivity value at a given wavelength, and the nanoparticles have a second reflectivity value at the given wavelength, and wherein the feedstock powder has a third reflectivity value at the given wavelength, and the third reflectivity is less than the first reflectivity value; and b) producing a metal alloy material using an additive manufacturing process with the feedstock powder.

In any of the aspects or embodiments described above and herein, the feedstock powder may have a concentration by volume of nanoparticles, and the additive manufacturing process may utilize a laser power source relatively movable at a scan speed, and the additive manufacturing process may include exposing the feedstock powder to a predetermined power input from the laser power source at a predetermined scan speed to produce the metal alloy material; wherein the concentration by volume of nanoparticles within the feedstock powder is such that the exposing the feedstock powder to a first said predetermined power input from the laser power source at a first said predetermined scan speed gives the metal alloy material a first microstructure, and exposing the feedstock powder to a second said predetermined power input from the laser power source at a second said predetermined scan speed gives the metal alloy material a second microstructure, wherein the first microstructure is different from the second microstructure.

In any of the aspects or embodiments described above and herein, the additive manufacturing process may have a process window for the feedstock powder, the process window defined by a maximum power input from a laser power source and a maximum scan speed; and wherein the first said predetermined power input from the laser power source and the first said predetermined scan speed are within the process window, and the second said predetermined power input from the laser power source and the second said predetermined scan speed are within the process window.

In any of the aspects or embodiments described above and herein, the first microstructure may be a columnar microstructure.

In any of the aspects or embodiments described above and herein, the second microstructure may be an equiaxed microstructure.

In any of the aspects or embodiments described above and herein, the second microstructure may be a mixed equiaxed and columnar microstructure.

According to another aspect of the present disclosure, a method of producing a feedstock powder is provided. The method includes: a) providing a base powder having a first reflectivity value at a first wavelength; b) providing nanoparticles having a second reflectivity value at the first wavelength; and c) disposing the nanoparticles onto surfaces of the base powder to form a feedstock powder, which feedstock powder having a third reflectivity value at the first wavelength, and the third reflectivity value is less than the first reflectivity value.

DETAILED DESCRIPTION

The present disclosure provides an improved methodology for additive manufacturing ("AM") processes such as selective laser melting that uses a laser beam as a source of energy for additively manufacturing a component from a powder feedstock, as well as with other types of AM processes. Hence, the present disclosure is not limited to a selective laser melting process, or AM processes that utilize a laser beam as an energy source. For ease of description, however, the present disclosure is described below in terms of an additive manufacturing process that utilizes a laser beam.

Figure 2A:
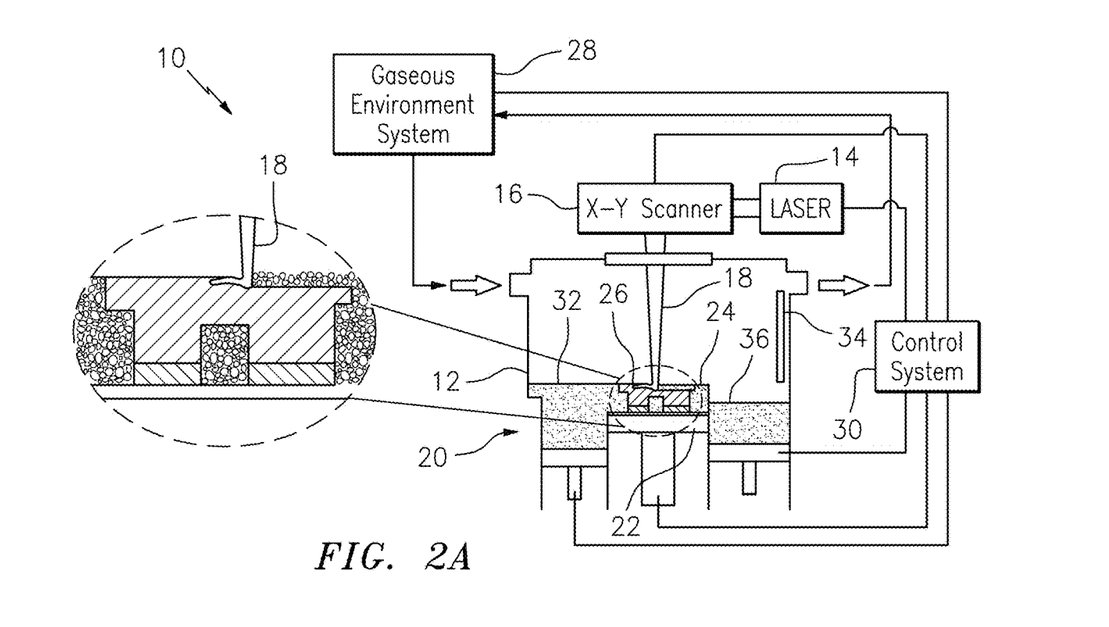
FIG. 2A is a schematic representation of an exemplary additive manufacturing system, showing an energy source in the form of a laser beam acting upon a powder bed to form a component within the powder bed.
Figure 2B:
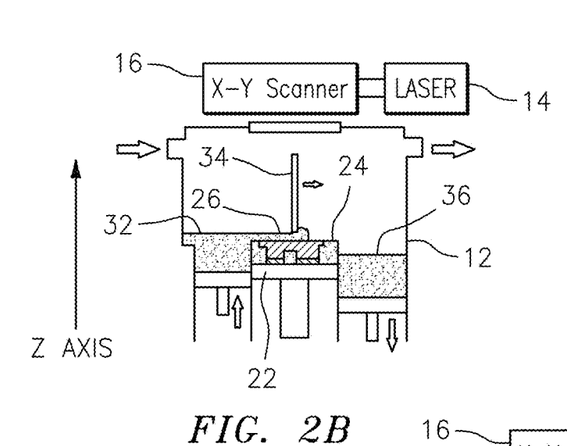
FIG. 2B is a schematic representation of the exemplary additive manufacturing system shown in FIG. 2A, illustrating a powder applicator applying a layer of feedstock powder to the powder bed.
Figure 2C:
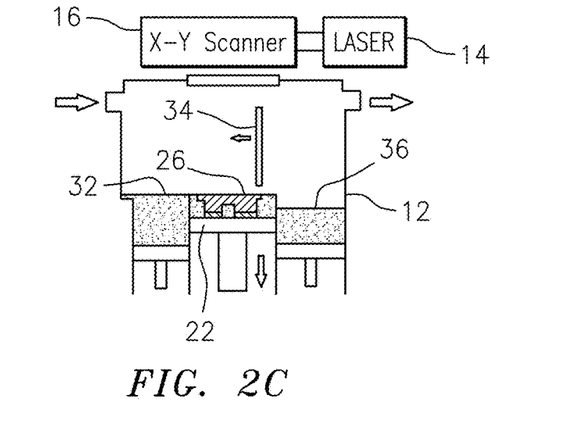
FIG. 2C is a schematic representation of the exemplary additive manufacturing system shown in FIGS. 2A and 2B, with the powder applicator returning after applying a layer of feedstock powder to the powder bed, and the powder bed platform moving vertically downwardly.

The present disclosure may be used with a variety of different AM systems, and is not therefore limited to any particular type of AM system. Non-limiting examples of AM systems include laser powder bed fusion type systems, direct energy deposition type systems (e.g., which may include multi-axis robotic systems), LENS™ additive manufacturing systems, etc. FIGS. 2A, 2B, and 2C schematically show an exemplary type of AM system 10 that may be used with the present disclosure. As stated above, the present disclosure is not limited thereto. The exemplary AM system 10 shown in FIGS. 2A-2C includes a housing 12, a laser 14, an X-Y scanner 16 operable to direct a laser beam 18 emitted from the laser 14 in an X-Y plane (e.g., selectively traverse the laser beam 18 within the X-Y plane), a powder feed system 20, a platform 22 for supporting a powder bed 24 and the component 26 to be produced, a gaseous environment system 28, and a control system 30. As stated above, the AM system 10 may utilize a multi-axis system (e.g., that includes a powder feed system rather than a powder bed.). The gaseous environment system 28 may be configured to provide a predetermined gaseous environment (e.g., an inert gas such as N2, Ar, etc.) into the housing 12 and to remove gas from the housing 12 as well. The housing 12 typically provides a structure configured to contain the gaseous environment (e.g., under pressure greater than ambient), and may include a heat source for selectively maintaining a given temperature within the housing 12. Hence, the gaseous environment system 28 and the housing 12 (with the control system 30 as indicated below) may cooperate to maintain a predetermined environment in which a component 26 may be additively manufactured (e.g., gas content, temperature, pressure, etc.). The platform 22 for supporting the powder bed 24 and the component 26 to be produced is configured for selectively positioning along a Z-axis; e.g., to stepwise lower the powder bed 24 during the component 26 AM process. The powder feed system 20 provides the powder (e.g., the modified base powder/feedstock powder) that is utilized in the AM process. In the schematic drawings shown in FIGS. 2A-2C, the powder feed system 20 includes a powder reservoir 32, a powder applicator 34, and a powder overflow reservoir 36. During the AM process, the powder applicator 34 is operable to apply a uniform layer of powder over the powder bed 24, and the powder overflow reservoir 36 is operable to receive any excess powder that remains after the layer application. FIG. 2A schematically illustrates an AM system 10 with the laser 14 activated to input energy into the feedstock powder disposed within the powder bed 24, and a component 26 being formed. FIG. 2B schematically illustrates the AM system 10 shown in FIG. 2A, with the powder applicator 34 applying a layer of feedstock powder to the powder bed 24. FIG. 2C schematically illustrates the AM system 10 shown in FIGS. 2A and 2B, with the powder applicator 34 returning after applying a layer of feedstock powder to the powder bed 24, and the powder bed platform 22 moving vertically downwardly. These schematic steps may be repeated numerous times during the AM formation of the component 26. As stated above, the present disclosure is not limited to the schematically shown system; e.g., alternative AM systems with which the present disclosure may be utilized include direct energy deposition type systems and LENS™ additive manufacturing systems, or the like, that may include multi-axis robotic aspects and/or powder feed subsystems. In a direct energy deposition type systems or a LENS™ additive manufacturing systems, the scan speed may refer to the traversing speed of a deposition head (relative to the substrate being produced) that includes the powder feed source and the laser energy source.

The control system 30 is configured to permit an operator to control operation of the AM system 10. The control system 30 may include at least one controller (not shown). The control system 30 may be in communication (e.g., signal communication) with one or more of the laser 14, the X-Y scanner 16, the powder feed system 20, the platform 22, the gaseous environment system 28, sensors, etc. The control system 30 may include any type of computing device, computational circuit, or any type of process or processing circuit capable of executing a series of instructions that are stored in memory. The control system 30 may include any combination of analog and digital components or control signals. The control system 30 may include multiple processors and/or multicore CPUs and may include any type of processor, such as a microprocessor, digital signal processor, co-processors, a micro-controller, a microcomputer, a central processing unit, a field programmable gate array, a programmable logic device, a state machine, logic circuitry, analog circuitry, digital circuitry, etc., and any combination thereof. The instructions stored in memory may represent one or more algorithms for controlling the aspects of the AM system 10 and the stored instructions are not limited to any particular form (e.g., program files, system data, buffers, drivers, utilities, system programs, etc.) provided they can be executed by the control system 30. The memory may be a non-transitory computer readable storage medium configured to store instructions that when executed by one or more processors, cause the one or more processors to perform or cause the performance or certain functions. The memory may be a single memory device or a plurality of memory devices. A memory device may include a storage area network, network attached storage, as well as a disk drive, a read-only memory, random access memory, volatile memory, non-volatile memory, static memory, dynamic memory, flash memory, cache memory, and/or any device that stores digital information. One skilled in the art will appreciate, based on a review of this disclosure, that the implementation of the control system 30 may be achieved via the use of hardware, software, firmware, or any combination thereof. The control system 30 may also include input (e.g., a keyboard, a touch screen, etc.) and output devices (e.g., a monitor, sensor readouts, data ports, etc.) that enable the operator to input instructions, received data, etc.

During operation of the AM system 10, the control system 30 (e.g., via executed instructions) may selectively: a) control the gaseous environment system 28 and the housing 12 to create a predetermined environment within the housing 12 (e.g., an inert gas environment, depending on the reactivity of the powder being used, at a predetermined pressure and temperature); b) control the powder feed system 20 (e.g., to selectively apply powder layers over the powder bed 24); c) the vertical position (Z-axis) of the powder bed 24, and therefore the component 26 being produced); d) control the amount of energy produced by the laser 14 (i.e., the amount of energy input into the powder material); or e) the X-Y scanner 16 (e.g., to direct the laser energy to the appropriate X-Y locations within the powder bed 24 during formation of the component 26); or any combination thereof.

The amount of energy produced by the laser 14 (e.g., the laser beam 18) is typically adjustable up to a known maximum value for the given AM system 10. The relative movement between the X-Y scanner 16 and the powder bed 24 (and therefore the component 26 being produced therein; e.g., the "scan speed") is also typically adjustable up to a known maximum value for the given AM system 10.

As stated above, within an AM process a component 26 may be produced by sequentially adding a plurality of layers of material, which layers collectively form the component 26, or a body that may be used to further form the component 26. In general terms, a thin layer of a feedstock powder is deposited initially over a substrate. The energy provided by the laser beam 18 melts and fuses the powder particles selectively, as dictated by control instructions, to form a two-dimensional ("2D") slice of the component 26 geometry. This process is repeated numerous times during the component 26 formation process.

As stated above, an AM system 10 may be described as having a "process window" that is a function of the available energy input of the AM system and the scan speed of the system. According to aspects of the present disclosure, however, the process window of an AM system is more accurately described as a function of both the particular AM system and the powder being processed. In terms of the powder, the reflectivity (or conversely the absorption) of the powder can significantly affect the energy received by the powder from the AM system laser. In fact, in an additive manufacturing system, the powder being deposited as a metal or metal alloy is typically subjected to substantially less energy from the laser than the laser actually produces. The energy losses may be due to reflectivity (e.g., the laser light being reflected from the powder), conductivity, radiation, etc. Of these energy losses, reflectivity is dominant. If the reflectivity of a powder is such that 50% of incident laser light is reflected, then that may have the effect of decreasing the laser energy input of the AM device into the powder by 50% for that particular powder. Characteristics of a powder that can affect its reflectivity include, but are not limited to, its electrical and thermal properties, including conductivities, temperature, composition, particle size, and surface roughness. Of these characteristics, surface roughness appears to play a significant role in affecting reflectivity. The term "effective laser power", therefore, may be used to refer to the amount of energy that is actually input into the powder that is deposited.

It should be noted that during the AM deposition process, a melt pool of the powder is created on the earlier deposited layers of the component being manufactured. Hence, the melt pool and the substrate each receive some amount of the laser energy input from the laser source. To simplify the description herein, however, the input energy (i.e., the "effective laser power") will be described as being input into the powder that is being deposited.

As used herein, the term "base powder" refers to a powdered metal or powdered metal alloy, or any combination thereof. Non-limiting examples of acceptable base powders include powders that comprise metals or metal-containing compounds, such as (but not limited to) Al, Mg, Ni, Fe, Cu, Ti, V, Si, Nb, Co, W, Zr, Hf, Mo, Ta, Cr, or combinations thereof. As will be described below, the base powder particles are modified with nanoparticles to form "feedstock powder" particles, which feedstock powder particles influence the AM process, including but not limited to the energy input/powder melting portion of the AM process.

Nanoparticles are particles with the largest dimension between about 1 nm and about 5000 nanometers ("nm"). Nanoparticles may be spherical or of arbitrary shape with the largest dimension typically not exceeding the above largest dimensions. The nanoparticles may be solid, hollow, or some combination of solid nanoparticles and hollow nanoparticles. The nanoparticle size for a given application may be selected based on the desired properties of the end material and/or component being formed, or based on the ability of the nanoparticles to impart a desired surface roughness to the base powder particles which surface roughness may affect (e.g., decrease) the reflectivity of the base powder particles as will be detailed below, or some combination thereof. For example, in some applications nanoparticles having an average size of about 2000 nm or less are desirable, in other applications nanoparticles having an average size of about 500 nm or less are desirable, while in other applications nanoparticles having an average size of about 100 nm or less are desirable. The present disclosure is not limited to any particular nanoparticle average size.

The nanoparticles are typically a different composition than the base powder. The nanoparticles may consist of a single material or alloy, or a plurality of materials, and may include a coating of one or more layers; e.g., layers of different materials. Non-limiting examples of acceptable nanoparticles include metals, ceramics, cermets, intermetallic alloys, oxides, carbides, nitrides, borides, polymers, carbon, and combinations thereof.

The nanoparticles are attached to the base powder particles to form modified base powder particles hereinafter referred to as "feedstock powder particles". Non-limiting acceptable examples of attachment mechanisms include electrostatic forces, Van der Waals forces, chemical bonds (e.g., ionic bonds, covalent bonds, etc.), physical bonds, binders/adhesives, etc. There are many known methodologies that can be used to attach nanoparticles to powder particles (e.g., immersion deposition, electroless deposition, vapor coating, solution/suspension coating of particles with or without organic ligands, and utilizing electrostatic forces and/or Van der Waals forces to attach particles through mixing, etc.), and the present disclosure is not limited to any particular methodology.

Figure 1:
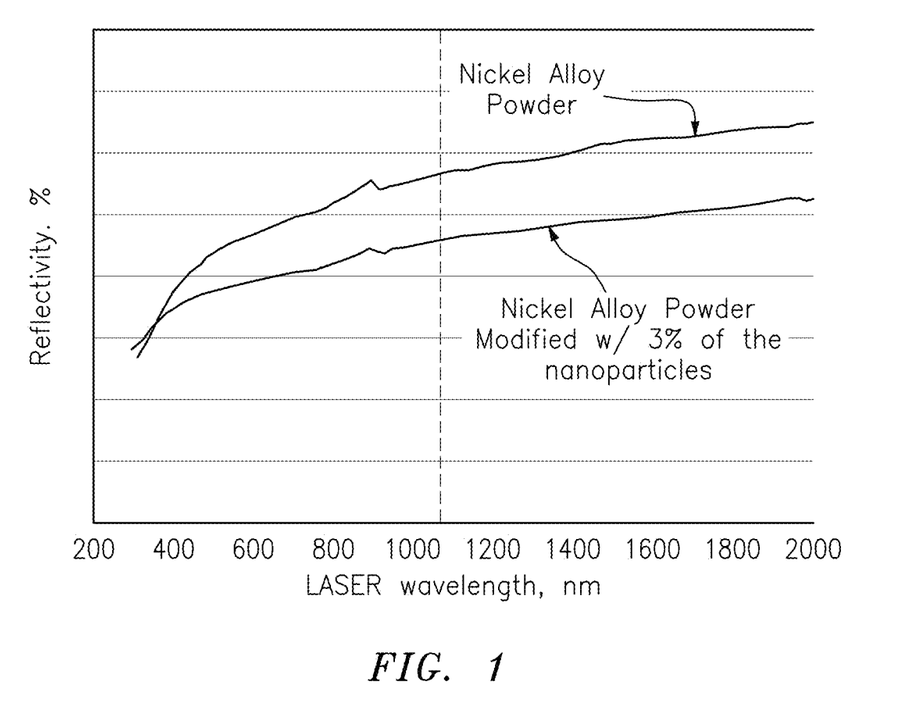
FIG. 1 is a graph of powder reflectivity percentage (Y-axis) versus laser wavelength of a simulated bed of powder (e.g., a laser powder bed fusion system) of a type that may be utilized in an additive manufacturing system, including a data line representative of an unmodified nickel alloy powder and a data line representative of a nickel alloy powder modified with three percent (3%) yttria nanoparticles; data collected using hemispheric directional reflectance (HDR) measurement techniques.

The nanoparticles are preferably present in the feedstock powder in a concentration that is acceptable for the component material being produced, and to selectively affect the AM process used to produce the component material. As explained herein, aspects of the present disclosure include producing a feedstock powder that selectively influences the AM process in which it is used. More specifically and as explained below, a given AM device processing a given powder will have a particular process window (e.g., effective laser power versus scan speed). A feedstock powder according to aspects of the present disclosure can be produced that selectively and advantageously influences (e.g., alters) the aforesaid process window. Hence, an acceptable concentration of nanoparticles may depend on factors including but not limited to the selected component material, properties of the nanoparticles themselves (e.g., reflectivity, the surface roughness they impart to the surface of a feedstock particle, etc.), the percentage of permissible inclusion without deleterious effect on the component material (e.g., if the nanoparticles are considered an "impurity", an alloy specification may specify a maximum concentration, such as 0.05% by weight), a desired microstructure of the component material, and the degree to which the inclusion of nanoparticles with a base powder affects the AM processing that produces the component material. A non-limiting example is a nickel alloy powder that may be modified with about three percent by volume (3% by volume) of yttria nanoparticles (e.g., yttria nanoparticles attached to the exterior surface of the nickel alloy powder particles). As can be seen in FIG. 1, for example, a graph of reflectivity percentage versus laser wavelength (in nanometers; data collected using hemispheric directional reflectance (HDR) measurement techniques) shows that unmodified nickel alloy powder particles have a higher reflectivity percentage than the nickel alloy particles modified with 3% by volume yttria nanoparticles by volume for a range of laser wavelengths. Routine experimentation can be performed by a person of ordinary skill in the art to inform material selection and concentration for the nanoparticles. As stated above, the nanoparticle concentration may be selected to change the reflectivity. The present disclosure is not limited to any particular mechanism for changing the base powder particle reflectivity. An example of how the reflectivity may be changed via the addition of nanoparticles is a change in the surface roughness (e.g., an increase) of the base powder particles; i.e., the feedstock particles have a decreased reflectivity relative to the base powder particles.

In some embodiments, a thin coating can be applied to the exterior surfaces of a base powder, which coating may be in the form of a continuous coating or an intermittent coating. A continuous coating covers substantially all of the exterior surface of the base powder particles (recognizing there may be defects, voids, or impurities at the surface and not all particles within a powder may be coated exactly the same). An intermittent coating is non-continuous and covers less than all of the exterior surface of the base powder particles. Routine experimentation can be performed by a person of ordinary skill in the art to inform coating coverage for a given coating material and base powder.

Figure 3:
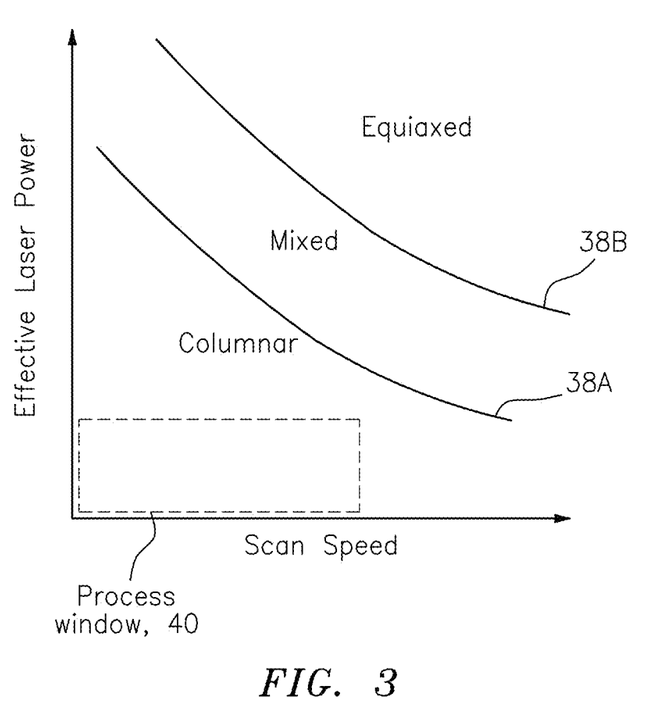
FIG. 3 shows an exemplary microstructural transition map for a nickel alloy produced from an unmodified base powder, including transitional boundaries between different microstructures, having a vertical axis of effective laser power versus a horizontal axis of scan speed and a process window.

The process window of an AM system 10 for a particular powder has implications regarding the microstructure of the metal (or metal alloy) being formed in the AM process. As can be seen in FIG. 3, for a given AM system 10 and a given powder, the process window 40 indicates the type of microstructure that can be produced; e.g., in FIG. 3 the process window 40 indicates the only microstructure available for the given AM system 10 and powder is a columnar microstructure. A person of skill in the art will recognize that the microstructure of a material often affects the mechanical properties of the material, and that a component 26 formed from a particular material will be acceptable when the material has a first microstructure, but will not be acceptable when the material has a different second microstructure. Hence, the process window 40 of a given AM system 10 for a given powder may dictate that some components 26 can be acceptably manufactured using that particular AM system 10 with that particular powder, while other components 26 cannot be acceptably manufactured by the same AM system 10 and powder. Moreover, in some instances it may be desirable to form a particular component 26 with regions of a first microstructure (e.g., equiaxed), other regions of a second microstructure (e.g., columnar), and still other regions of a third microstructure (e.g., a mixture of equiaxed and columnar). If the process window 40 of an AM system 10 cannot produce the aforesaid different microstructures utilizing the particular powder, then the component 26 cannot be formed using the aforesaid AM system and powder. The present disclosure provides an AM solution to this issue for many types of materials. Indeed, the present disclosure provides a means by which the effective laser power of an AM system 10 can be altered via the powder being processed; e.g., by decreasing reflectivity, the effective laser power increases. Hence, the AM system is able to input a greater amount of energy into a powder using a feedstock powder than would be possible with an unmodified base powder, and relatedly has a modified process window. In short, aspects of the present disclosure utilize modifications to the powder to favorably alter the process window of a given AM system 10.

As indicated above, in some embodiments the present disclosure utilizes base powder particles modified with nanoparticles to form a feedstock powder. The nanoparticles attached to the exterior surface of the powder particles are typically chosen to change certain characteristics of the powder and/or the material solidification process that enhance the AM process. For example, a feedstock powder with the nanoparticles typically has a reflectivity that is lower than the unmodified base powder. This change in reflectivity may in part be due to the concomitant change in surface roughness of the feedstock powder due to the presence of the nanoparticles on the surface, the inherent interaction of the nanoparticles with the laser, or a combination of these or other effects. As a result, for a given laser power, a greater percentage of the energy produced by the laser is absorbed by the feedstock powder during the AM process (and less laser light is reflected); i.e., the effective laser power available is greater. As a result, and if desired, a greater scan speed can be utilized. Collectively, the greater effective laser power and the greater scan speed produces a larger process window 40 for the powder feedstock being used in an AM process to manufacture the component 26. Hence, the present disclosure includes selectively modifying base powder particles via attached nanoparticles to alter the reflectivity of the powder particles (e.g., produce a modified powder feedstock with a lower reflectivity percentage). The specific reflectivity of a feedstock powder with nanoparticles may be a function of variables such as the amount/concentration of nanoparticles attached to the feedstock powder particles, the nanoparticle size, and the type of nanoparticles. In some instances, the base powder may have a first reflectivity value at a given wavelength, and the nanoparticles may have a second reflectivity value at the given wavelength. The reflectivity of the base powder may be higher than the reflectivity of the nanoparticles. The feedstock powder may have a reflectivity value that is between the reflectivity value of the base powder and the reflectivity value of the nanoparticles. In some instances, as indicated above, the addition of the nanoparticles to the base powder surface may produce a surface roughness that synergistically decreases the reflectivity of the feedstock powder. In some instances, however, there may be a saturation point at which the amount of nanoparticles on a feedstock powder particle produces a reflectivity that is roughly equal to or even exceeds the reflectivity of base powder particle; e.g., as the feedstock powder becomes more saturated with nanoparticles, the surface roughness may decline and the reflectivity of the powder may approach or meet the reflectivity of the nanoparticle. As stated above, for a given base powder material and a given nanoparticle material, routine experimentation can be performed by a person of ordinary skill in the art to determine desirable nanoparticle size, concentration and characteristics in terms of reflectivity.

As stated above, in some embodiments a base powder may be modified to a feedstock powder by applying a thin coating to the exterior surfaces of a base powder, which coating may be in the form of a continuous coating or an intermittent coating; e.g., applied by atomic layer deposition or plasma processing. In these embodiments, prior to the AM process, the applied thin coating may not include nanoparticles, but may be configured to give the feedstock powder particles a reflectivity that is less than the reflectivity of the base powder particles. The applied thin coating, however, may be configured such that upon the applied thin coating being exposed to an incident laser beam 18 the applied thin coating will fracture into fine particles that can subsequently act as nucleation sites within a melt pool of the component 26 material.

Figure 4:
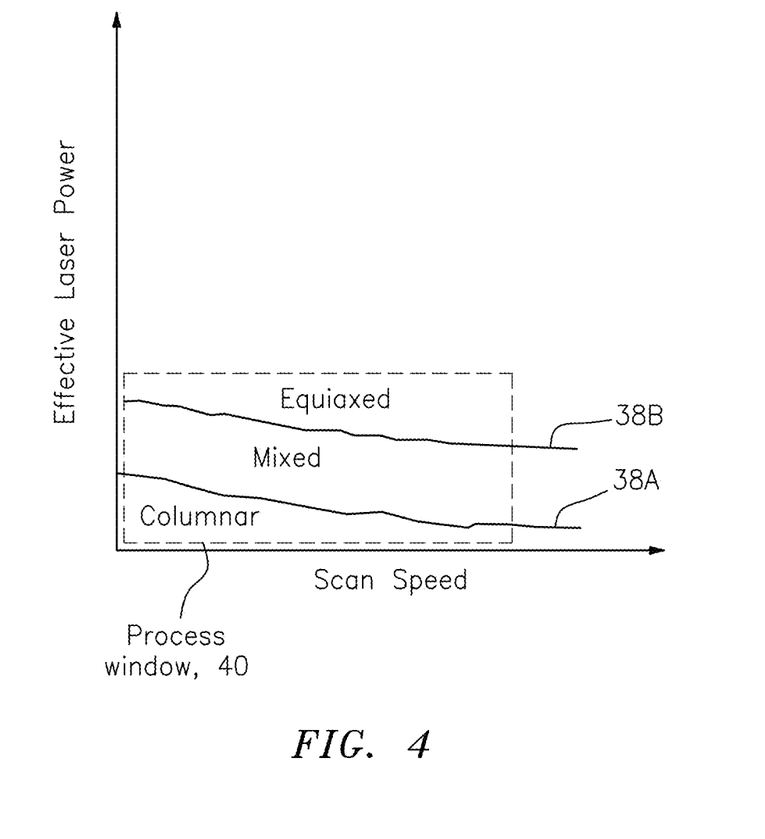
FIG. 4 shows an exemplary microstructural transition map for a nickel alloy produced from a feedstock powder with nanoparticles, including transitional boundaries between different microstructures, having a vertical axis of effective laser power versus a horizontal axis of scan speed and a process window.

According to another aspect of the present disclosure, a base powder can be modified with nanoparticles to produce a feedstock powder that selectively affects the grain size of the material being formed in the AM process. For example, a base powder can be selectively modified with nanoparticles that are configured to act as nucleation sites within a material melt pool created during the AM process. The density of the nucleation sites within the material melt pool will affect the solidification and microstructure of the material. A feedstock powder with an amount of nanoparticles sufficient to create a relatively high density of nucleation sites may produce a microstructure with a smaller grain size, such as an equiaxed microstructure. In similar manner, a feedstock powder with an amount of nanoparticles sufficient to create a relatively low density of nucleation sites may produce a microstructure with a larger grain size, such as a columnar microstructure. A feedstock powder with an amount of nanoparticles generally in the middle of the aforesaid high and low amounts, may produce a microstructure with a mix of equiaxed grains and columnar grains. Hence, the degree to which the base powder is modified with nanoparticles (e.g., the amount of nanoparticles per feedstock powder particle) can be chosen to produce a desired microstructure. The diagrammatic microstructural transition maps shown in FIGS. 3 and 4 illustrate how modifying a base powder to create a feedstock powder with nanostructures can affect the relative positions of the transitional boundary lines for a given material. It should be noted, however, FIGS. 3 and 4 are provided to illustrate a change in relative positions of: a) the transitional boundary line 38A between the columnar microstructure region and the mixed columnar and equiaxed microstructure region; b) the transitional boundary line 38B between the mixed columnar and equiaxed microstructure region and the equiaxed microstructure region; and c) the process window 40, and are non-limiting examples. Specifically, FIG. 3 depicts the transitional boundary lines 38A, 38B of an unmodified base powder, relative to one another and relative to a process window 40. FIG. 4, on the other hand, depicts the transitional boundary lines 38A, 38B of a base powder modified into a feedstock powder with nanostructures, relative to one another and relative to a process window 40. It can be seen between FIGS. 3 and 4 that the transitional boundary lines 38A, 38B between the columnar microstructure region, the mixed equiaxed and columnar microstructure region, and the equiaxed microstructure region are shifted and the process window 40 is increased in size. In FIG. 3, the process window 40 only accesses the columnar microstructure region. Hence, for the given AM system 10 with the unmodified base powder, the AM system 10 is only able to produce a material having a columnar grain microstructure. In FIG. 4, on the other hand, the process window 40 accesses the columnar microstructure region, the mixed equiaxed and columnar microstructure region, and the equiaxed microstructure region. Hence, for the given AM system 10 with the feedstock powder with nanostructures, it is possible to produce a material having a columnar grain microstructure, or a material having a mixed equiaxed and columnar microstructure, or a material having an equiaxed microstructure using the given AM system 10. The AM process, therefore, has considerably more utility and in some instances may be used to produce components 26 heretofore not possible with an AM process. For a given base powder material and a given nanoparticle material, routine experimentation can be performed by a person of ordinary skill in the art to determine desirable nanoparticle size, concentration and characteristics in terms of affecting the transitional boundary lines 38 between the columnar region, the mixed equiaxed and columnar region. The instructions stored within and executable by the control system 30 may reflect input variables (e.g., nanoparticle size, concentration and characteristics, etc.) to permit an operator of the AM system to achieve desired microstructures under predetermined operation conditions.

According to another aspect of the present disclosure, a base powder can be modified with nanoparticles to produce a feedstock powder having a different thermal conductivity than the thermal conductivity of the base powder. For example, a base powder can be selectively modified with nanoparticles to produce a feedstock powder with nanoparticles that has a higher thermal conductivity than the thermal conductivity of the base powder. The higher thermal conductivity can, for example, increase the size of the process window 40 by increasing the permissible scan speed of the AM process; e.g., the increased thermal conductivity decreases the requisite laser beam 18 dwell time to effectuate the desired powder melt and therefore permits faster scan speeds. Referring again to FIGS. 3 and 4, the increased process window 40 is in part attributable to an increase in thermal conductivity, and the shift in the transitional boundary lines between the columnar region, the mixed equiaxed and columnar region, and the equiaxed region, provides greater flexibility in the AM process to achieve different microstructures. Here again, the instructions stored within and executable by the control system 30 may reflect input variables (e.g., thermal conductivity values associated with particular feedstock powder nanoparticle concentrations, etc.) to permit an operator of the AM system to achieve desired microstructures under predetermined operation conditions.

One of the benefits of the present disclosure is that an operator of an AM process utilizing the present disclosure can produce a component 26 with a desired microstructure. In fact, using the teachings of the present disclosure, an operator may be able to produce a particular component 26 with different regions having different microstructures; i.e., the operator can tailor the microstructures in different regions of the component 26 to suit the application at hand.

Figure 5:
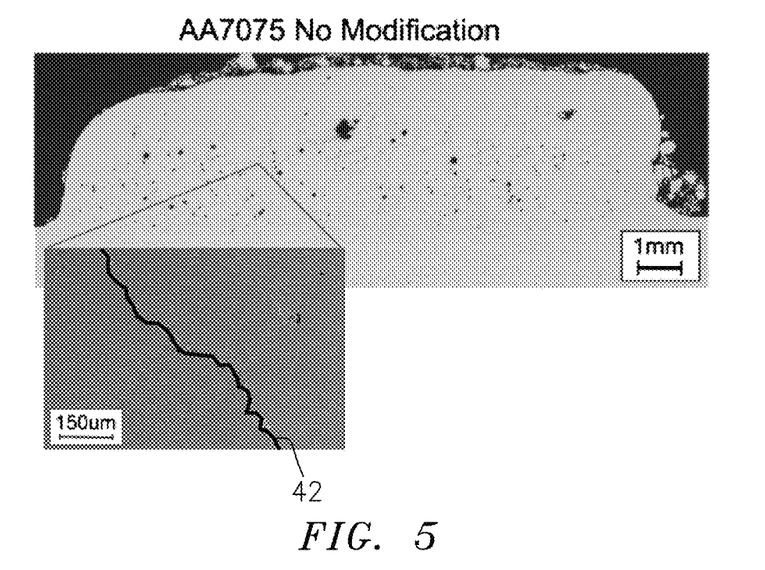
FIG. 5 contains an image of a cross-section of an aluminum alloy (AA7075) produced by an additive manufacturing process with an unmodified base powder.
Figure 6:
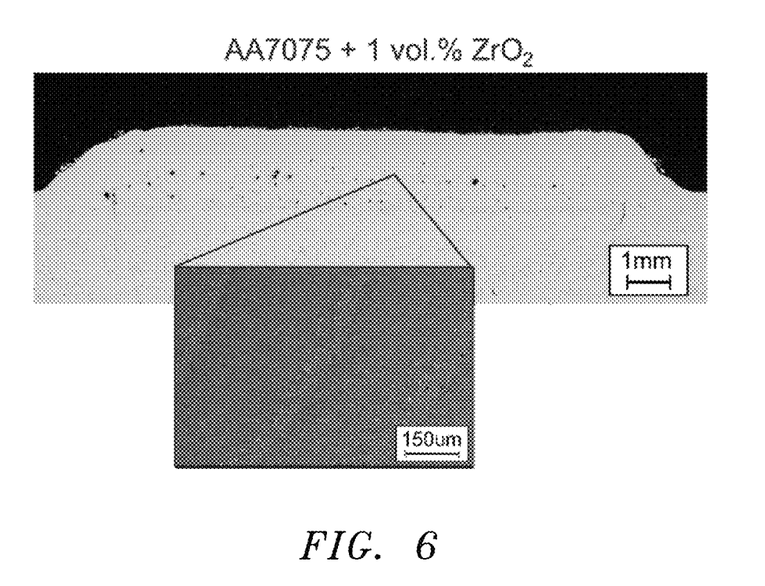
FIG. 6 contains an image of a cross-section of an aluminum alloy (AA7075) produced by an additive manufacturing process with a feedstock powder with nanoparticles.
Figure 7:
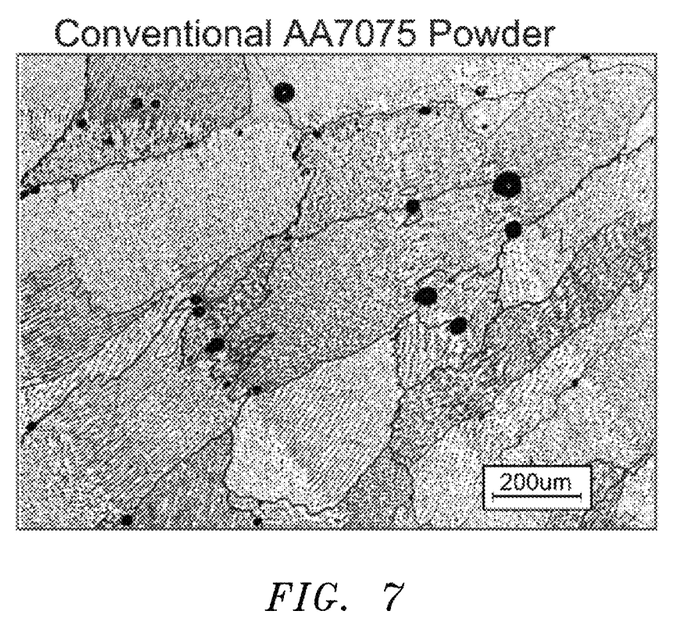
FIG. 7 contains an etched image of the aluminum alloy (AA7075) shown in FIG. 6.
Figure 8:
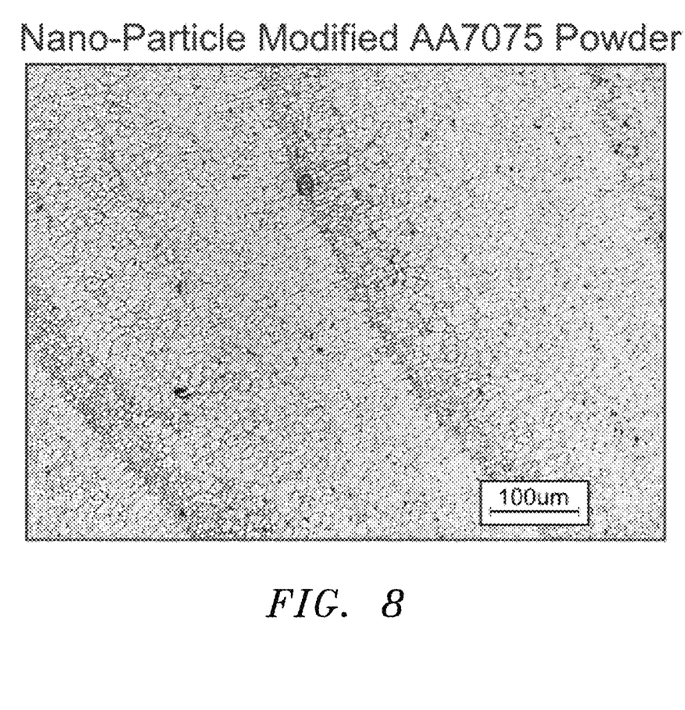
FIG. 8 contains an etched image of the aluminum alloy (AA7075) shown in FIG. 7.

To illustrate the above described aspects of the present disclosure, the image within FIG. 6 shows a cross-section of an aluminum alloy (AA7075) produced by an AM process with an unmodified base powder. The AM process included a directed energy deposition at 1010 watts, and a scan speed of ten inches per minute. As can be seen from the image in FIG. 5, the AM produced aluminum alloy material contains a high degree of cracking 42. The image within FIG. 6, in contrast, shows a cross-section of an aluminum alloy (AA7075) produced by an AM process with a feedstock powder having zirconium oxide nanoparticles in an amount of one percent by volume (AA7075 modified with 1% by volume of $ZrO_2$). As can be seen from the image in FIG. 6, the AM produced aluminum alloy material produced with a feedstock with nanoparticles solidified without cracks. The image within FIG. 7 is an etched image of the aluminum alloy (AA7075) shown in FIG. 5. As can be seen in FIG. 7, the aluminum alloy (AA7075) produced by an AM process with the unmodified base powder has a dendritic solidification. The image within FIG. 8 is an etched image of the aluminum alloy (AA7075) shown in FIG. 6. As can be seen in FIG. 8, the aluminum alloy (AA7075) produced by an AM process with a feedstock with nanoparticles has a cellular solidification appearance.

As can be seen from the above, the present disclosure provides an AM method and apparatus that can increase the process window 40 for an AM process, and also can permit an operator to select a microstructure for a given material produced using a AM process.

As used in this specification and the appended claims, the singular forms "a," "an," and "the" include plural forms thereof unless the context clearly indicates otherwise. Unless otherwise indicated, all numbers expressing conditions, concentrations, dimensions, and so forth used in the specification and claims are to be understood as being modified in all instances by the term "about".

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially. Therefore, the particular order of the steps set forth in the description should not be construed as a limitation.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A process for additive manufacturing of a metal alloy material, said process comprising:
providing a feedstock powder comprising base powder particles with nanoparticles attached to surfaces of the base powder particles, the feedstock powder having a concentration by volume of nanoparticles;
providing an additive manufacturing system with a laser power source movable at a scan speed relative to the metal alloy material;
wherein the additive manufacturing system has a process window for the feedstock powder, the process window defined by a maximum power input from the laser power source and a maximum scan speed;
exposing the feedstock powder to a first predetermined power input from the laser power source at a first predetermined scan speed to produce a first portion of the metal alloy material having a columnar microstructure; and
exposing the feedstock powder to a second predetermined power input from the laser power source at a second predetermined scan speed to produce a second portion of the metal alloy material having an equiaxed microstructure, one or both of the second predetermined power input and the second predetermined scan speed being different than the respective first predetermined power input and the first predetermined scan speed;
wherein each of the steps of exposing the feedstock powder to the first predetermined power input from the laser power source at the first predetermined scan speed and exposing the feedstock powder to the second predetermined power input from the laser power source at the second predetermined scan speed are performed a plurality of times collectively adding layers of the metal alloy material on top of one another to produce the metal alloy material; and
wherein at least one of the layers of the metal alloy material is part of the first portion of the metal alloy material having the columnar microstructure, and at least one of the layers of the metal alloy material is part of the second portion of the metal alloy material having the equiaxed microstructure.

2. The process of claim 1, further comprising exposing the feedstock powder to a third predetermined power input from the laser power source at a third predetermined scan speed to produce a third portion of the metal alloy material having a third microstructure, different than the columnar microstructure or the equiaxed microstructure.

3. The process of claim 2, wherein the third microstructure is a mixed equiaxed and columnar microstructure.

4. The process of claim 1, wherein the feedstock powder has a first reflectivity value for a given wavelength of light produced by the laser power source, and the base powder particles have a second reflectivity value for the given wavelength of light produced by the laser power source, and the first reflectivity value is less than the second reflectivity value.

5. The process of claim 1, wherein the metal alloy material is a nickel alloy material.

6. The process of claim 1, wherein the metal alloy material is an aluminum alloy material.

7. The process of claim 1, wherein the base powder particles comprise a first material type and the nanoparticles comprise a second material type, and the first material type is different from the second material type.

8. The process of claim 1, wherein the second predetermined power input is greater than the first predetermined power input.

9. The method of claim 1, wherein the base powder particles comprise an AA7075 aluminum alloy and the nanoparticles comprise zirconium oxide ($ZrO_2$).

10. The method of claim 9, wherein the concentration by volume of nanoparticles is one percent.

11. The method of claim 1, wherein the base powder particles comprise a nickel alloy and the nanoparticles comprise yttria.

12. The method of claim 11, wherein the concentration by volume of nanoparticles is three percent.

13. A method of additively manufacturing a metal alloy material, comprising:
- providing a feedstock powder having a base powder with a plurality of surface attached nanoparticles, wherein the base powder has a first reflectivity value at a given wavelength, and the nanoparticles have a second reflectivity value at the given wavelength, and wherein the feedstock powder has a third reflectivity value at the given wavelength, and the third reflectivity value is less than the first reflectivity value; and
- producing a metal alloy material using an additive manufacturing process with the feedstock powder by exposing the feedstock powder to a predetermined power input from a laser power source movable at a predetermined scan speed relative to the metal alloy material, including:
  - exposing the feedstock powder to a first predetermined power input from the laser power source at a first predetermined scan speed to produce a first portion of the metal alloy material having a columnar microstructure; and
  - exposing the feedstock powder to a second predetermined power input from the laser power source at a second predetermined scan speed to produce a second portion of the metal alloy material having an equiaxed microstructure, one or both of the second predetermined power input and the second predetermined scan speed being different than the respective first predetermined power input and the first predetermined scan speed;
- wherein each of the steps of exposing the feedstock powder to the first predetermined power input from the laser power source at the first predetermined scan speed and exposing the feedstock powder to the second predetermined power input from the laser power source at the second predetermined scan speed are performed a plurality of times collectively adding layers of the metal alloy material on top of one another to produce the metal alloy material; and
- wherein at least one of the layers of the metal alloy material is part of the first portion of the metal alloy material having the columnar microstructure, and at least one of the layers of the metal alloy material is part of the second portion of the metal alloy material having the equiaxed microstructure.

14. The method of claim 13, wherein the additive manufacturing process has a process window for the feedstock powder, the process window defined by a maximum power input from a laser power source and a maximum scan speed; and
- wherein the first predetermined power input from the laser power source and the first predetermined scan speed are within the process window, and the second predetermined power input from the laser power source and the second predetermined scan speed are within the process window.

15. The method of claim 13, further comprising exposing the feedstock powder to a third predetermined power input from the laser power source at a third predetermined scan speed to produce a third portion of the metal alloy material having a third microstructure, different than the columnar microstructure or the equiaxed microstructure.

16. The method of claim 13, wherein the second predetermined power input is greater than the first predetermined power input.

17. A process for additive manufacturing of a metal alloy material, the process comprising:
- providing an additive manufacturing system with a laser power source movable at a scan speed relative to the metal alloy material;
- providing a feedstock powder comprising base powder particles having a first process window defined by a first effective power input range and a first scan speed range, the feedstock powder further comprising nanoparticles attached to surfaces of the base powder particles so that the feedstock powder has a second process window defined by a second effective power input range and a second scan speed range, the second effective power input range or the second scan speed range of the second process window being greater than the respective first effective power input range or the first scan speed range of the first process window, the feedstock powder having a concentration by volume of the nanoparticles;
- exposing the feedstock powder to a first predetermined power input from the laser power source at a first predetermined scan speed to produce a first portion of the metal alloy material; and
- exposing the feedstock powder to a second predetermined power input from the laser power source at a second predetermined scan speed to produce a second portion of the metal alloy material, one or both of the second predetermined power input and the second predetermined scan speed being different than the respective first predetermined power input and the first predetermined scan speed,
- wherein one or both of the second predetermined power input or the second predetermined scan speed is outside of the first process window and both of the second predetermined power input and the second predetermined scan speed are within the second process window;
- wherein each of the steps of exposing the feedstock powder to the first predetermined power input from the laser power source at the first predetermined scan speed and exposing the feedstock powder to the second predetermined power input from the laser power source at the second predetermined scan speed is performed a plurality of times collectively adding layers of the metal alloy material on top of one another to produce the metal alloy material; and
- wherein at least one of the layers of the metal alloy material is part of the first portion of the metal alloy material having a columnar microstructure, and at least one of the layers of the metal alloy material is part of the second portion of the metal alloy material having an equiaxed microstructure.

* * * * *